United States Patent
Lee

(10) Patent No.: US 10,510,276 B1
(45) Date of Patent: Dec. 17, 2019

(54) APPARATUS AND METHOD FOR CONTROLLING A DISPLAY OF A VEHICLE

(71) Applicants: HYUNDAI MOTOR COMPANY, Seoul (KR); KIA MOTORS CORPORATION, Seoul (KR)

(72) Inventor: Hyung Seok Lee, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/200,235

(22) Filed: Nov. 26, 2018

(30) Foreign Application Priority Data

Oct. 11, 2018 (KR) .................. 10-2018-0121245

(51) Int. Cl.
```
G09G 3/00      (2006.01)
G06K 9/00      (2006.01)
G02B 27/01     (2006.01)
B60K 35/00     (2006.01)
```
(52) U.S. Cl.
CPC ............. *G09G 3/001* (2013.01); *B60K 35/00* (2013.01); *G02B 27/0101* (2013.01); *G02B 27/0179* (2013.01); *G06K 9/00845* (2013.01); *B60K 2370/334* (2019.05); *B60K 2370/52* (2019.05); *B60K 2370/736* (2019.05); *G02B 2027/014* (2013.01); *G02B 2027/0138* (2013.01); *G02B 2027/0181* (2013.01); *G09G 2340/0464* (2013.01); *G09G 2354/00* (2013.01); *G09G 2380/10* (2013.01)

(58) Field of Classification Search
CPC ......... B60K 2370/736; G09G 2380/10; G09G 2354/00; G09G 3/001; G09G 2340/0464; G02B 2027/0181; G02B 27/0179
See application file for complete search history.

(56) References Cited

U.S. PATENT DOCUMENTS

2018/0354440 A1* 12/2018 Pouliquen ............... B60R 21/01
2019/0143816 A1* 5/2019 Wakatsuki ......... G02B 27/0101
                                                          345/632
2019/0286130 A1* 9/2019 Tsuchiya ............... G05D 1/0223

FOREIGN PATENT DOCUMENTS

KR          20100026466         3/2010

* cited by examiner

*Primary Examiner* — Ryan R Yang
(74) *Attorney, Agent, or Firm* — Lempia Summerfield Katz LLC

(57) ABSTRACT

An apparatus for controlling a display of a vehicle includes a camera obtaining a face image of a driver, a sensor sensing a location of a seat on which the driver is seated, and a controller. The controller is configured to determine a location of an eye of the driver based on the face image and the location of the seat and to correct a projection location of a virtual image projected onto a display device based on the location of the eye. The apparatus allows the virtual image to be accurately matched with a road by changing the projection location of a virtual image depending on the height of a driver's eye, thereby providing the driver with an undistorted image.

20 Claims, 10 Drawing Sheets

_US 10,510,276 B1_

APPARATUS AND METHOD FOR CONTROLLING A DISPLAY OF A VEHICLE

CROSS-REFERENCE TO RELATED APPLICATION

This application is based on and claims the benefit of priority to Korean Patent Application No. 10-2018-0121245, filed in the Korean Intellectual Property Office on Oct. 11, 2018, the entire contents of which are incorporated herein by reference.

TECHNICAL FIELD

The present disclosure relates to an apparatus and a method for controlling a display of a vehicle.

BACKGROUND

Nowadays, with the development of electronic devices, apparatuses for the convenience of the driver are being developed to improve functions associated with the performance and safety of a vehicle. In particular, there is growing interest in a head-up display (HUD) of the vehicle.

The HUD is designed to display driving information on the windshield of a vehicle or airplane. Initially, the HUD has been introduced to ensure that a pilot is able to view information in the front view. However, the HUD has been recently introduced in vehicles to reduce accidents.

The HUD of a vehicle displays a variety of vehicle information, such as arrow information for guiding path changes operating in conjunction with a navigation device, and text information indicating the speed of a vehicle, on the windshield glass or in the form of augmented reality beyond the windshield glass, thereby preventing a driver's gaze from being dispersed. In other words, for the purpose of verifying vehicle information, a driver may not need to move his/her eyes in the direction of the terminal providing the corresponding information. The HUD helps improve the driver's safety because the driver can drive while looking at the front view in which the head-up display image is displayed.

Furthermore, there is a need for a separate display means capable of displaying an increasing amount of vehicle information as more devices for the convenience of the driver are mounted in a vehicle. Accordingly, there is a growing interest in the HUD as there is a need for the space for separately accommodating these display means.

The general HUD may include an image generator, a mirror device, and a controller. After being reflected from the mirror device, a video image displayed by the image generator (e.g., a video image corresponding to various pieces of vehicle information received from an Electronic Control Unit (ECU) in a vehicle) is projected onto the windshield of the driver's seat.

As such, while driving, the driver of a vehicle not only may keep his/her eyes forward but also may verify various pieces of information necessary to drive the vehicle, such as the driving information or the navigation information of the vehicle, through the virtual image projected within the range not departing from the field of vision at the same time.

However, since the general head-up display fixedly projects a virtual image at a specific preset location, the physical condition of the driver or the movement of the driver are not considered. Accordingly, the image projected by the head-up display system is not exactly matched with the road.

SUMMARY

The present disclosure is directed to solving the above-described problems of the related art while advantages achieved by the prior art are maintained intact. Throughout the present disclosure, terms such as "eye" or "driver's eye" refer to the eye of a driver. Additionally, terms such as "both eyes" or "driver's both eyes" refer to both eyes of a driver.

The present disclosure is directed to an apparatus and a method for controlling the display of a vehicle. The apparatus and method allow a virtual image to be accurately matched with a road, even though the height of the driver's eye may change, by changing the projection location of the virtual image depending on the changed height of the driver's eye. The height of the driver's eye may have changed due to the movement of the driver, the location of the driver, or the nearby environment.

The technical problems to be solved by the present disclosure are not limited to the aforementioned problems. Any other technical problems not mentioned herein will be clearly understood from the following description by those of ordinary skill in the art to which the present disclosure pertains.

According to an embodiment of the present disclosure, an apparatus for controlling a display of a vehicle includes a camera obtaining a face image of a driver, a sensor sensing a location of a seat on which the driver is seated, and a controller. The controller is configured to determine a location of an eye of the driver based on the face image and the location of the seat. The controller is further configured to correct a projection location of a virtual image projected onto a display device, based on the location of the eye.

According to an embodiment, the controller is configured to determine a location of the driver by using a height of the eye of the driver calculated based on the face image and a distance from a front end of the vehicle to the seat, which is calculated based on the location of the seat.

According to an embodiment, the controller is configured to detect a center of both eyes based on the obtained face image and to calculate the height of the eye of the driver based on the center of the both eyes.

According to an embodiment, the controller is configured to correct the projection location of the virtual image, when the detected center of the both eyes is placed within an effective region.

According to an embodiment, a horizontal range of the effective region is defined as a range of an effective angle of view of the camera. A vertical range of the effective region is defined as a vertical movement range of the seat.

According to an embodiment, an augmented reality image is displayed in front of the vehicle through the virtual image projected onto the display device.

According to an embodiment, the controller is configured to correct the projection location of the virtual image based on the location of the eye of the driver such that the augmented reality image is matched with a virtual location spaced apart from the vehicle by a predetermined distance.

According to an embodiment, the controller is configured to upwardly adjust the projection location so as to be higher than a predetermined projection location, when the location of the eye of the driver is higher than a predetermined location.

According to an embodiment, the controller is configured to downwardly adjust the projection location so as to be lower than a predetermined projection location, when the location of the eye of the driver is lower than a predetermined location.

According to an embodiment, the display device includes a head-up display.

According to another aspect of the present disclosure, a method for controlling a display of a vehicle includes obtaining a face image of a driver, sensing a location of a seat on which the driver is seated, determining a location of an eye of the driver based on the face image and the location of the seat, and correcting a projection location of a virtual image projected onto a display device, based on the location of the eye of the driver.

According to an embodiment, the determining of the location of the eye of the driver includes calculating a height of the eye of the driver based on the face image and determining a distance from a front end of the vehicle to the seat, which is calculated based on the location of the seat.

According to an embodiment, the calculating of the height of the eye of the driver includes detecting a center of both eyes based on the obtained face image and calculating the height of the eye of the driver based on the center of the both eyes.

According to an embodiment, the correcting of the projection location of the virtual image includes determining whether the detected center of the both eyes is placed within an effective region and correcting the projection location of the virtual image, when the detected center of the both eyes is placed within the effective region.

According to an embodiment, a horizontal range of the effective region is defined as a range of an effective angle of view of the camera. A vertical range of the effective region is defined as a vertical movement range of the seat.

According to an embodiment, an augmented reality image is displayed in front of the vehicle through the virtual image projected onto the display device.

According to an embodiment, the correcting of the projection location of the virtual image includes correcting the projection location of the virtual image based on the location of the eye of the driver such that the augmented reality image is matched with a virtual location spaced apart from the vehicle by a predetermined distance.

According to an embodiment, the correcting of the projection location of the virtual image includes correcting the projection location so as to be higher than a predetermined projection location, when the location of the eye of the driver is higher than a predetermined location.

According to an embodiment, the correcting of the projection location of the virtual image includes correcting the projection location so as to be lower than a predetermined projection location, when the location of the eye of the driver is lower than a predetermined location.

According to an embodiment, the display device includes a head-up display.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
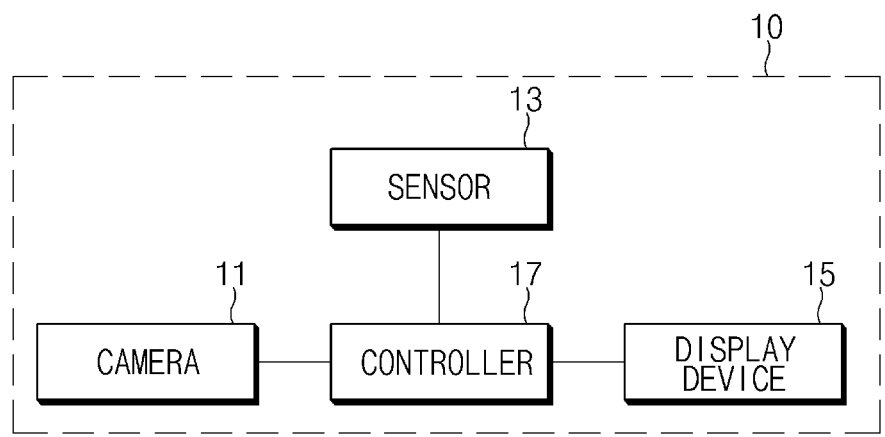
FIG. 1 is a block diagram illustrating an apparatus for controlling a display of a vehicle, according to an embodiment of the present disclosure.

Hereinafter, various embodiments of the present disclosure are described in detail with reference to the accompanying drawings. In the drawings, the same reference numerals are used throughout to designate the same or equivalent elements. In addition, a detailed description of well-known features or functions will be ruled out in order not to unnecessarily obscure the gist of the present disclosure.

In describing elements of various embodiments of the present disclosure, the terms first, second, A, B, (a), (b), and the like may be used herein. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which this disclosure belongs. It is to be understood that terms used herein should be interpreted as having a meaning that is consistent with their meaning in the context of the present disclosure and the relevant art and will not be interpreted in an idealized or overly formal sense unless expressly so defined herein.

FIG. 1 is a block diagram illustrating an apparatus for controlling a display of a vehicle, according to an embodiment of the present disclosure.

As illustrated in FIG. 1, the display controlling apparatus of a vehicle 10 may include a camera 11, a sensor 13, a display device 15, and a controller 17.

The camera 11 may be included in the vehicle to obtain an image of a driver. More specifically, the camera 11 may be mounted in the steering wheel or the cluster of the vehicle to obtain the face image of the driver.

According to an embodiment of the present disclosure, the camera 11 may include an infrared camera and may obtain the face image and the eye image of the driver by using infrared rays.

The sensor 13 may sense a change in the location of the seat on which the driver is seated. According to an embodiment of the present disclosure, the sensor 13 may include a Hall sensor included in a seat motor. The Hall sensor may output a sensing signal when the seat motor is driven to move the seat.

The display device 15 may include a head-up display, i.e., a HUD, and may include a glass (a windshield), a combiner (a transparent plate), or the like, of the front surface of the vehicle, onto which the virtual image is projected. Herein, the virtual image may include vehicle information such as vehicle speed, mileage, or revolution per minute (RPM), path information, or the like, which is provided to the driver.

Hereinafter, for convenience of description, a location at which a virtual image is displayed on the display device 15 may be referred to as a "projection location", and a location at which a virtual image projected onto the display device 15 is displayed on a road in front of a vehicle as an augmented reality image may be referred to as a "virtual location".

The controller 17 may control overall operations of the display controlling apparatus of the vehicle according to an embodiment of the present disclosure.

The controller 17 obtains the driver's face image from the camera 11. The controller 17 may determine whether the center between both eyes is detected from the driver's face image. The controller 17 may allow a virtual image to be projected at a predetermined projection location, when it is determined that the center between both eyes is not detected.

The controller 17 may determine whether the center of both eyes is present within an effective region, when it is determined that the center of both eyes is detected. The controller 17 may calculate the height of the driver's eye, when it is determined that the center of both eyes is present within the effective region. Herein, the horizontal range of the effective region may be defined as the range of the effective angle of view of the camera 11. The vertical range of the effective region may be defined as a vertical movement range of a seat. In addition, the height of the driver's eye may be the distance from the ground to the center of both eyes.

According to an embodiment, the effective angle of view of the camera 11 may have a range between 14° and −14° with respect to the center of the camera. Furthermore, the vertical movement range of the seat may have a range of upward 110 mm and downward 70 mm from the default height of the seat (a default value set at the factory).

The controller 17 may allow a virtual image to be projected at a predetermined projection location, when it is determined that the center of both eyes is not present within the effective region.

In this example, the predetermined projection location may represent a projection location of the virtual image in a state where the driver is capable of gazing at the augmented reality image displayed at a virtual location spaced apart by a predetermined distance without distortion.

The controller 17 may calculate the distance from the front end of a vehicle to the seat based on the sensing signal received from the sensor 13.

The controller 17 may calculate the location of the driver's eye based on the calculated height of the driver's eye and the distance from the front end of a vehicle to a seat.

The controller 17 may determine whether the calculated location of the driver's eye is changed. For example, the controller 17 may determine whether the location of the driver's eye is changed by comparing the location of the driver's eye with a predetermined location.

In this example, the predetermined location may include the height of an eye and a seat distance (the distance from the front end of a vehicle to a seat) at which the virtual location where the augmented reality image is displayed is matched with the front view of a vehicle. Thus, the driver can verify a virtual image displayed as augmented reality without distortion, when the virtual image projected at the predetermined projection location is displayed as an augmented reality image.

The controller 17 may change the projection location of a virtual image depending on the calculated location of the driver's eye, when it is determined that there is a difference between the calculated location of the driver's eye and the predetermined location.

In more detail, the controller 17 may adjust the projection location of a virtual image based on the calculated height of the driver's eye and the distance from the front end of a vehicle to a seat, so as to be higher than the predetermined projection location. The controller 17 then may allow the virtual image to be projected, when it is determined that the calculated location of the driver's eye is higher than the predetermined location.

Moreover, the controller 17 may adjust the projection location of a virtual image based on the calculated height of the driver's eye and the distance from the front end of a vehicle to a seat, so as to be lower than the predetermined projection location. The controller 17 then may allow the virtual image to be projected, when it is determined that the calculated location of the driver's eye is lower than the predetermined location.

The controller 17 may allow the virtual image to be projected at the predetermined projection location, when it is determined that there is no difference between the calculated location of the driver's eye and the predetermined location.

Figure 2:
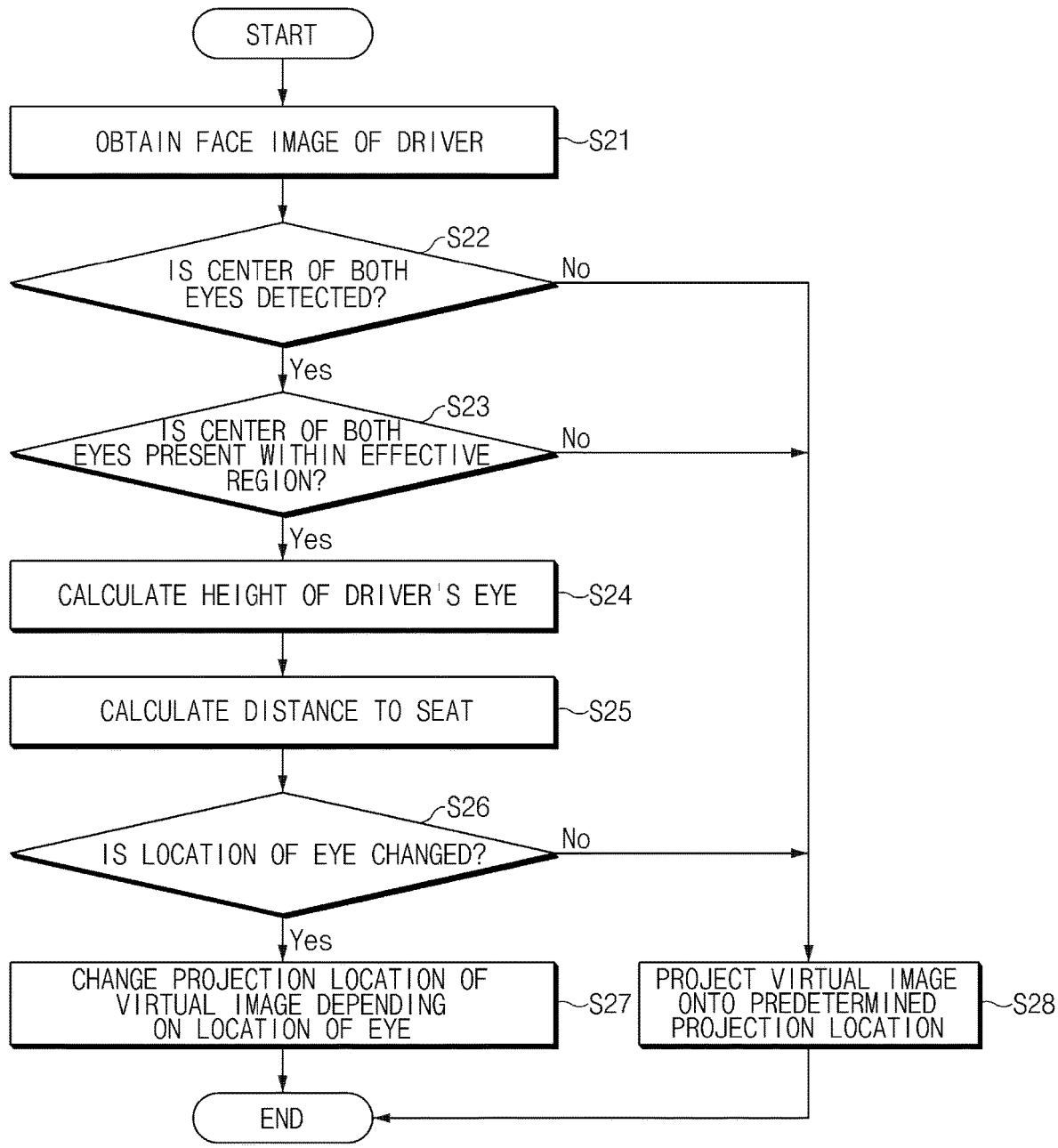
FIG. 2 is a flowchart illustrating a method for controlling a display of a vehicle, according to an embodiment of the present disclosure.

FIG. 2 is a flowchart illustrating a method for controlling a display of a vehicle, according to an embodiment of the present disclosure.

Referring to the method for controlling the display of a vehicle according to an embodiment of the present disclosure in FIG. 2, in operation S21, the controller 17 obtains a face image of a driver.

In operation S22, the controller 17 may determine whether the center of the driver's both eyes is detected, based on the obtained face image of the driver. In operation S23, the controller 17 may determine whether the center of the driver's both eyes is present within an effective region, when it is determined that the centers of the driver's both eyes is detected (Y) in operation S22. In operation S28, the controller 17 may allow a virtual image to be projected at a predetermined projection location, when it is determined that the center of the driver's both eyes is not detected in operation S22 (N).

In operation S23, the horizontal range of the effective region may be defined as the range of the effective angle of view of the camera 11. The vertical range of the effective region may be defined as a vertical movement range of a seat.

In operation S24, the controller 17 calculates the height of the driver's eye, when it is determined that the center of both eyes is present within the effective region (Y) in operation S23.

In operation S25, the controller 17 calculates the distance from the front end of a vehicle to the seat based on the sensing signal received from the sensor 13. In operation S25, the controller 17 may determine the location of the driver's eye based on the calculated height of the driver's eye and the distance from the front end of a vehicle to a seat.

In operation S26, the controller 17 determines whether the location of the driver's eye is changed.

In operation S26, the controller 17 may compare the calculated location of the driver's eye with a predetermined location to determine whether the location of the driver's eye is changed.

In operation S26, the predetermined location may include the height of an eye and a seat distance at which the virtual location of a virtual image displayed as augmented reality is matched with the front view of a vehicle and thus the driver can verify the virtual image displayed as augmented reality without distortion, when the virtual image projected at the predetermined projection location is displayed as an augmented reality.

In operation S27, the controller 17 may change the projection location of a virtual image depending on the calculated location of the driver's eye, when it is determined that the calculated location of the driver's eye is changed (Yes) in operation S26.

In operation S28, the controller 17 may allow the virtual image to be projected at the predetermined projection location, when it is determined that the calculated location of the driver's eye is not changed in operation S26.

Figure 3:
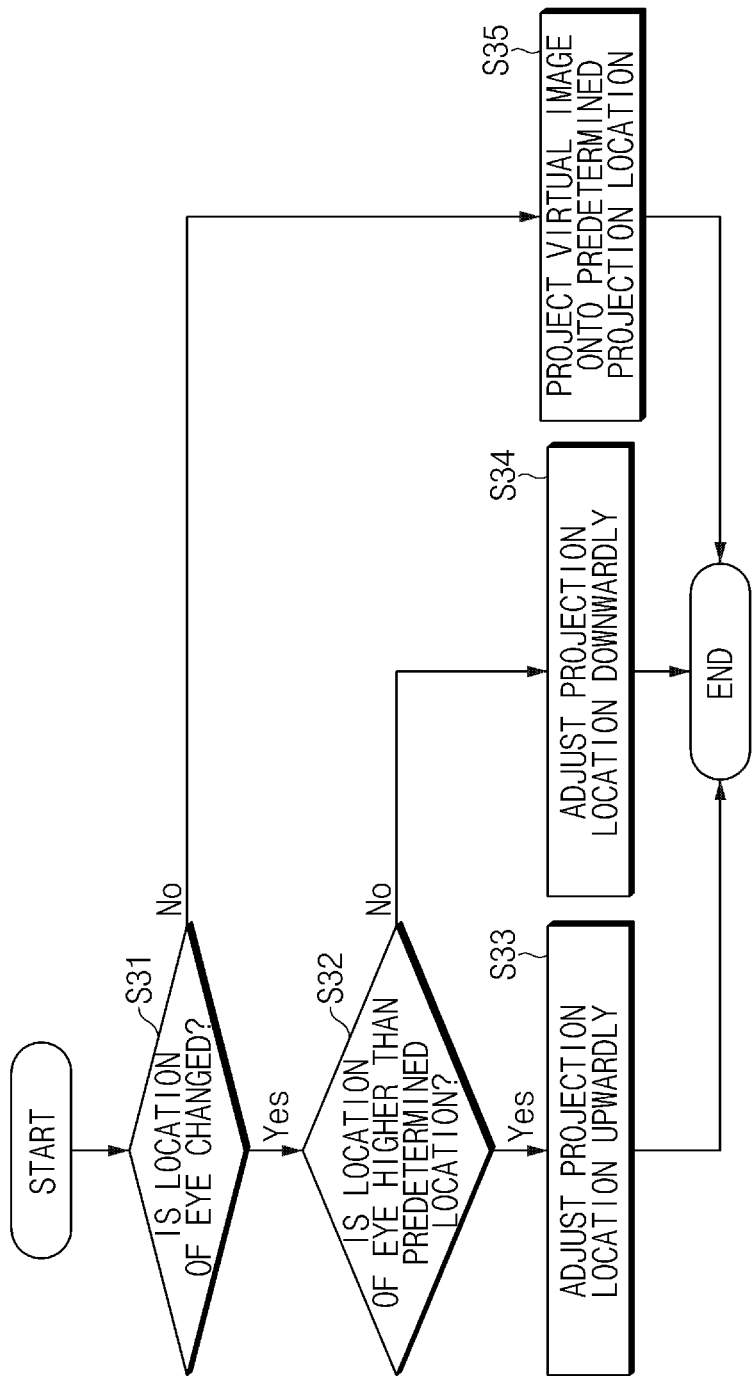
FIG. 3 is a flowchart illustrating a method for controlling a display of a vehicle, according to an embodiment of the present disclosure.

FIG. 3 is a flowchart illustrating a method for controlling a display of a vehicle, according to an embodiment of the present disclosure.

Referring to the flowchart of FIG. 3 illustrating a method for controlling the display of a vehicle according to an embodiment of the present disclosure, it is possible to specify a method of determining the location of a virtual image projected depending on the change in height of a driver's eye.

In operation S31, the controller 17 may determine the location of the driver's eye based on the calculated height of the driver's eye and a distance from the front end of a vehicle to a seat. The controller 17 may also determine whether the location of the eye is changed at a predetermined location.

In operation S32, the controller 17 may determine whether the calculated location of the driver's eye is higher than a predetermined location, when it is determined that the calculated location of the driver's eye is changed at the predetermined location (Y) in operation S31.

In operation S33, the controller 17 may adjust the projection location of a virtual image based on the calculated height of the driver's eye and the distance from the front end of a vehicle to a seat, so as to be higher than the predetermined projection location. The controller 17 then may allow the virtual image to be projected, when it is determined that the calculated location of the driver's eye is higher than the predetermined location (Y), in operation S32.

Also, in operation S34, the controller 17 may adjust the projection location of a virtual image based on the calculated height of the driver's eye and the distance from the front end of a vehicle to a seat, so as to be lower than the predetermined projection location. The controller 17 then may allow the virtual image to be projected, when it is determined that the calculated location of the driver's eye is lower than the predetermined location (N).

In operation S35, the controller 17 may allow the virtual image to be projected at the predetermined projection location, when it is determined that there is no difference between the calculated location of the driver's eye and the predetermined location (N) in operation S31.

Figure 4:
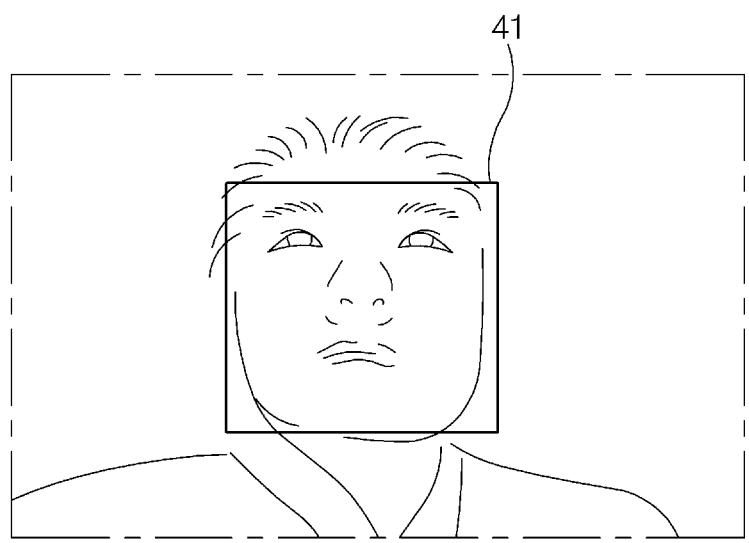
FIG. 4 is a view illustrating a detected face image, according to an embodiment of the present disclosure.

FIG. 4 is a view illustrating a detected face image, according to an embodiment of the present disclosure.

As illustrated in FIG. 4, the controller 17 may detect a driver's face 41 from the driver's face image obtained from the camera 11. According to an embodiment of the present disclosure, the detected face image may be an infrared image and may be obtained using a camera capable of capturing only the infrared region by illuminating the infrared light on the face while the camera is spaced apart from the face by a predetermined distance and there is no light. Accordingly, even when the inside of the vehicle is dark, the face image of the driver may be easily obtained and the controller 17 may easily detect a driver's face 41 from the face image.

Figure 5:
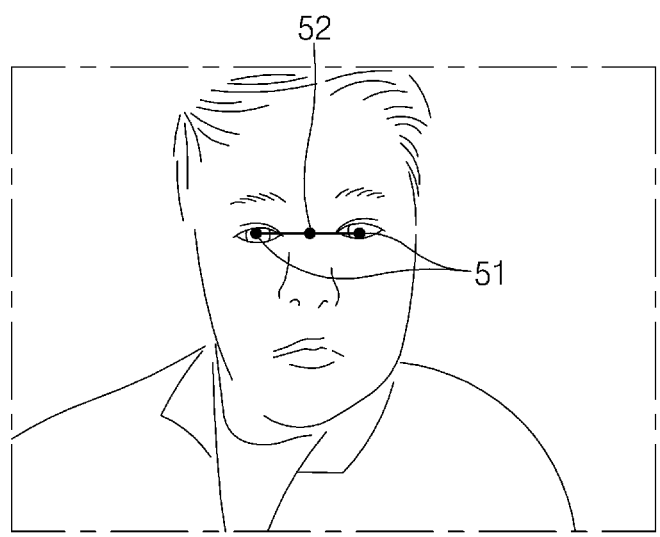
FIG. 5 is a view illustrating of a detected center of both eyes, according to an embodiment of the present disclosure.

FIG. 5 is a view illustrating a detected center of both eyes, according to an embodiment of the present disclosure.

As illustrated in FIG. 5, the controller 17 may sense both eyes 51 based on a driver's face image obtained from the camera 11 and may detect a center 52 of both eyes 51, i.e., a center point between both eyes of the driver.

Figure 6:
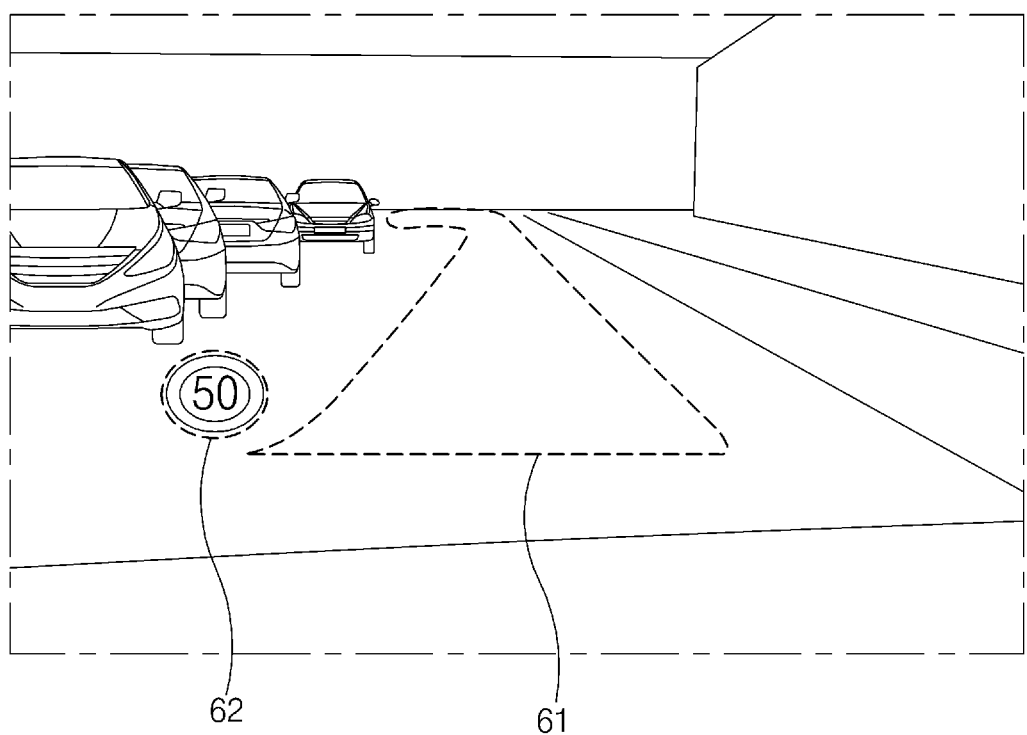
FIG. 6 is a view illustrating a displayed augmented reality image, according to an embodiment of the present disclosure.

FIG. 6 is a view illustrating a displayed augmented reality image, according to an embodiment of the present disclosure.

As illustrated in FIG. 6, a virtual image projected through the display device 15 may include path information 61 and speed information 62.

According to an embodiment, the path information 61 may be implemented with graphics for guiding a direction in which a vehicle will move along a path from the current location to the set destination. Moreover, the speed information 62 may be implemented with graphics indicating the speed limit on a road on which the vehicle is currently traveling.

However, the virtual image is not limited to the above-described embodiment. The virtual image may show that information associated with a vehicle such as mileage, the remaining distance to the destination, RPM, refueling information, or the like is implemented graphically.

Figure 7:
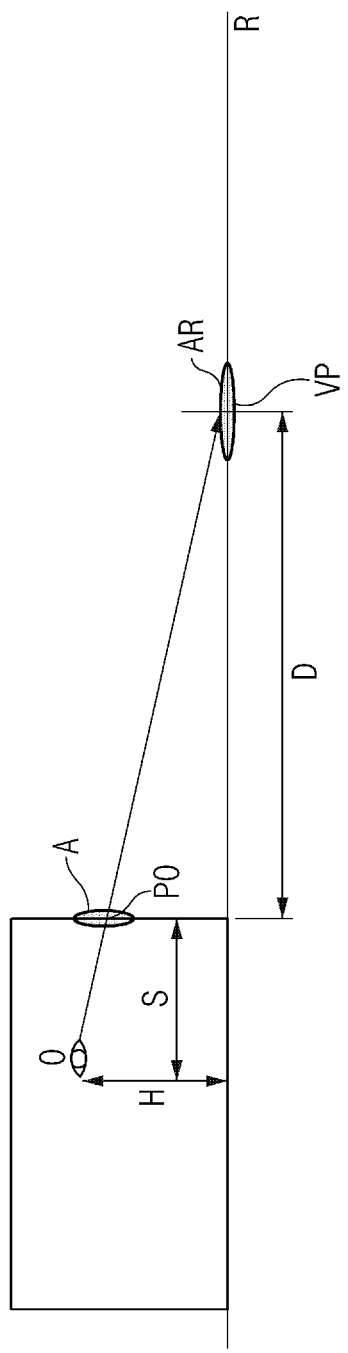
FIG. 7 is a view illustrating a projection location of a virtual image and a road matching location, according to an embodiment of the present disclosure.

FIG. 7 is a view illustrating a projection location of a virtual image and a road matching location, according to an embodiment of the present disclosure.

As shown in FIG. 7, the controller 17 may allow a virtual image A to be projected at a projection location P0 of the display device 15 of a vehicle. The controller 17 may allow an augmented reality image AR (61 or 62 of FIG. 6) to be displayed at a virtual location VP on a road R spaced apart by a predetermined distance D. In this embodiment, the predetermined distance D may generally represent the distance at which a driver can gaze at the augmented reality image in front of the vehicle without distortion and may be set to an arbitrary value according to the embodiment.

The controller 17 may measure a height H of the driver's eye and may measure a distance S from the front end of a vehicle to a seat, when it is assumed that the center of the driver's both eyes is O in a state where the driver gazes at the augmented reality image displayed at the virtual location VP spaced apart by the predetermined distance D through the virtual image A projected onto the display device 15 without distortion.

The controller 17 may determine that the height H of the driver's eye is a predetermined height of the driver's eye. The controller 17 may determine that the distance S from the front end of a vehicle to a seat is a predetermined seat distance. The controller 17 may further determine that the projection location P0 of the virtual image is a predetermined projection location. Furthermore, the controller 17 may determine that the center O of the both eyes is the predetermined location of the driver's eye.

Accordingly, the driver may gaze at the augmented reality image AR displayed at the virtual location VP spaced apart from the vehicle by the predetermined distance D through the virtual image A projected onto the display device 15 without distortion, when the height of the driver's eye is H and the distance from the front end of a vehicle to the seat is S.

Figure 8:
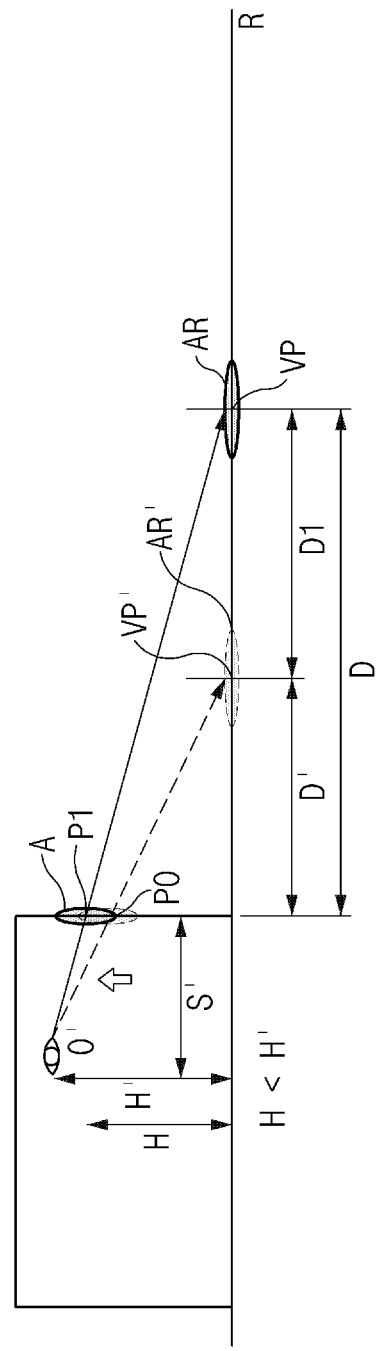
FIG. 8 is a view illustrating a projection location of a virtual image according to a changed height of an eye and a road matching location, according to an embodiment of the present disclosure.

FIG. 8 is a view illustrating a projection location of a virtual image according to a changed height of an eye and a road matching location, according to an embodiment of the present disclosure.

As illustrated in FIG. 8, the controller 17 may compare a height H' of a driver's eye with the predetermined height H of an eye to determine whether the location of the driver's eye is changed.

The controller 17 may determine that a location O' of the driver's eye is higher than the predetermined location O (refer to FIG. 7) of an eye, when the height H' of the driver's eye is higher than the predetermined height H of driver's eye and when a distance S' from the front end of a vehicle to a seat is changed at a predetermined seat distance.

An augmented reality image AR' may be displayed at a virtual location VP' on a road R spaced apart from a vehicle 10 by a first distance D', when the driver gazes at the augmented reality image AR' displayed through the virtual image A projected at the predetermined projection location P0 of the display device 15 in a state where the location O' of the driver's eye is higher than the predetermined location O of an eye.

In other words, the augmented reality image seems to be distorted because the augmented reality image is displayed at the location VP' closer than the location VP spaced apart from a vehicle by the predetermined distance D when the driver gazes at the augmented reality image AR' in a state where the height H' of the driver's eye is higher than the predetermined height H of the driver's eye. Accordingly, it is difficult to transfer accurate information to the driver.

According to an embodiment of the present disclosure, the controller 17 may allow the virtual image A to be projected at P1 obtained by upwardly adjusting the projection location of the display device 15 from a predetermined projection location P0, such that the driver gazes at the augmented reality image AR without distortion even though the height H' of the driver's eye is higher than the predetermined height H of an eye.

The controller 17 may allow the virtual image A to be projected at the projection location P1 adjusted upwardly from the predetermined projection location P0. The augmented reality image AR' displayed through the virtual image A may be matched with the virtual location VP, not the virtual location VP'. Accordingly, the driver may gaze at the augmented reality image in front of the vehicle without distortion.

According to an embodiment, for the driver to gaze at the augmented reality image without distortion, the controller 17 may set the second distance D1 such that the sum of a first distance D' and a second distance D1 is the predetermined distance D, and then may calculate the upward extent of the projection location based on the sum.

Figure 9:
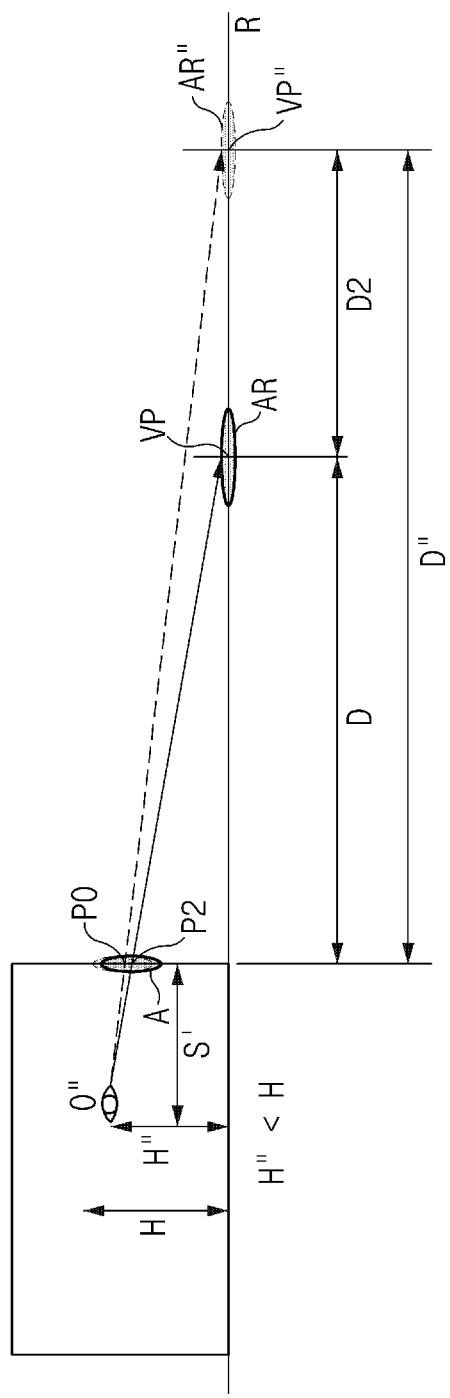
FIG. 9 is a view illustrating a projection location of a virtual image according to a height of an eye and a road matching location, according to another embodiment of the present disclosure.

FIG. 9 is a view illustrating a projection location of a virtual image according to a height of an eye and a road matching location, according to another embodiment of the present disclosure.

As illustrated in FIG. 9, the controller 17 may compare a height H" of a driver's eye with the predetermined height H of an eye to determine whether there is a change.

The controller 17 may determine that a location O" of the driver's eye is lower than the predetermined location O (refer to FIG. 7) of an eye, when the height H" of the driver's eye is lower than the predetermined height H of driver's eye and when the distance S' from the front end of a vehicle to a seat is changed at a predetermined seat distance.

An augmented reality image AR" may be displayed at the virtual location VP" on the road R spaced apart from the vehicle 10 by a third distance D", when the driver gazes at the augmented reality image AR" displayed through the virtual image A projected at the predetermined projection location P0 of the display device 15 in a state where the location O" of the driver's eye is lower than the predetermined location O of an eye.

In other words, the augmented reality image seems to be distorted because the augmented reality image is displayed at the location VP" farther than the location VP spaced apart from a vehicle by the predetermined distance D when the driver gazes at the augmented reality image AR" in a state where the height H" of the driver's eye is lower than the predetermined height H of the driver's eye. Accordingly, it is difficult to transfer accurate information to the driver.

According to an embodiment of the present disclosure, the controller 17 may allow the virtual image A to be projected at P2 obtained by downwardly adjusting the projection location of the display device 15 from a predetermined projection location P0, such that the driver gazes at the augmented reality image AR without distortion even though the height H" of the driver's eye is lower than the predetermined height H of an eye.

The controller 17 may allow the virtual image A to be projected at the projection location P2 adjusted downwardly from the predetermined projection location P0. The augmented reality image AR" displayed through the virtual image A may be matched with the virtual location VP, not the virtual location VP". Accordingly, the driver may gaze at the augmented reality image in front of the vehicle without distortion.

According to an embodiment, for the driver to gaze at the augmented reality image without distortion, the controller may set a fourth distance D2 such that the difference between the third distance D" and the fourth distance D2 is the predetermined distance D. The controller 17 then may calculate the downward extent of the projection location based on the difference.

Figure 10:
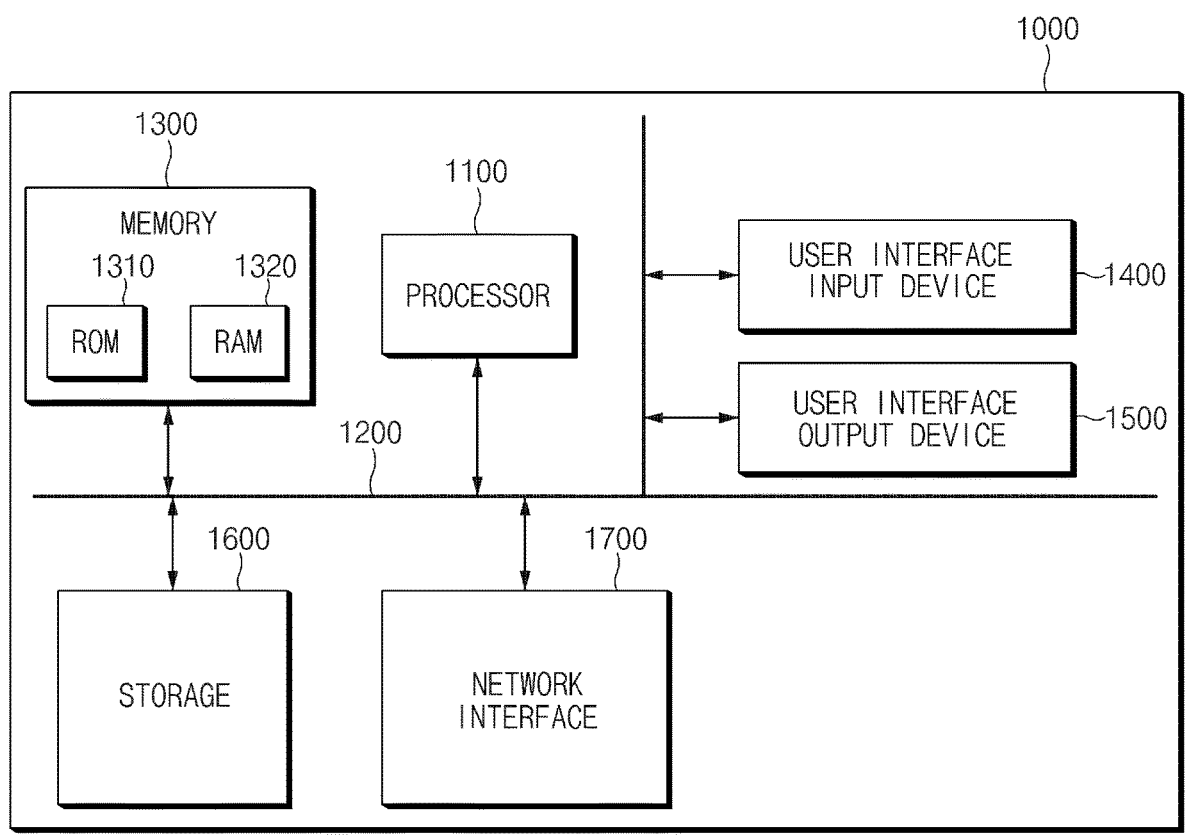
FIG. 10 is a block diagram illustrating a configuration of a computing system performing a method, according to an embodiment of the present disclosure.

FIG. 10 is a block diagram illustrating a configuration of a computing system performing a method, according to an embodiment of the present disclosure.

Referring to FIG. 10, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) and a random access memory (RAM).

Thus, the operations of the methods or algorithms described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM). The storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component in the user terminal.

Hereinabove, although the present disclosure has been described with reference to various embodiments and the accompanying drawings, the present disclosure is not limited thereto, but may be variously modified and altered by those of ordinary skill in the art to which the present disclosure pertains without departing from the spirit and scope of the present disclosure claimed in the following claims.

Therefore, embodiments of the present disclosure are not intended to limit the technical spirit of the present disclosure but provided only for the illustrative purpose. The scope of protection of the present disclosure should be construed by the attached claims, and all equivalents thereof should be construed as being included within the scope of the present disclosure.

According to an embodiment of the present disclosure, an apparatus and a method for controlling the display of a vehicle may allow the virtual image to be accurately matched with a road, by changing the projection location of a virtual image depending on the height of a driver's eye, thereby providing the driver with an undistorted image.

Hereinabove, although the present disclosure has been described with reference to various embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for controlling a display of a vehicle, the apparatus comprising:
   a camera configured to obtain a face image of a driver;
   a sensor configured to sense a location of a seat on which the driver is seated; and
   a controller,
   wherein the controller is configured to
   determine a location of an eye of the driver based on the face image and the location of the seat, and
   correct a projection location of a virtual image projected onto a display device, based on the location of the eye.

2. The apparatus of claim 1, wherein the controller is configured to determine a location of the driver by using a height of the eye of the driver calculated based on the face image and a distance from a front end of the vehicle to the seat, which is calculated based on the location of the seat.

3. The apparatus of claim 2, wherein the controller is configured to detect a center of both eyes based on the obtained face image and to calculate the height of the eye of the driver based on the center of the both eyes.

4. The apparatus of claim 3, wherein the controller is configured to correct the projection location of the virtual image, when the detected center of the both eyes is placed within an effective region.

5. The apparatus of claim 4, wherein a horizontal range of the effective region is defined as a range of an effective angle of view of the camera, and
   wherein a vertical range of the effective region is defined as a vertical movement range of the seat.

6. The apparatus of claim 1, wherein an augmented reality image is displayed in front of the vehicle through the virtual image projected onto the display device.

7. The apparatus of claim 6, wherein the controller is configured to correct the projection location of the virtual image based on the location of the eye of the driver such that the augmented reality image is matched with a virtual location spaced apart from the vehicle by a predetermined distance.

8. The apparatus of claim 1, wherein the controller is configured to upwardly adjust the projection location so as to be higher than a predetermined projection location, when the location of the eye of the driver is higher than a predetermined location.

9. The apparatus of claim 1, wherein the controller is configured to downwardly adjust the projection location so as to be lower than a predetermined projection location, when the location of the eye of the driver is lower than a predetermined location.

10. The apparatus of claim 1, wherein the display device includes a head-up display.

11. A method for controlling a display of a vehicle, the method comprising:
    obtaining a face image of a driver;
    sensing a location of a seat on which the driver is seated;
    determining a location of an eye of the driver based on the face image and the location of the seat; and
    correcting a projection location of a virtual image projected onto a display device, based on the location of the eye of the driver.

12. The method of claim 11, wherein the determining of the location of the eye of the driver includes:
    calculating a height of the eye of the driver based on the face image; and
    determining a distance from a front end of the vehicle to the seat, which is calculated based on the location of the seat.

13. The method of claim 12, wherein the calculating of the height of the eye of the driver includes:
    detecting a center of both eyes based on the obtained face image; and
    calculating the height of the eye of the driver based on the center of the both eyes.

14. The method of claim 13, wherein the correcting of the projection location of the virtual image includes:
    determining whether the detected center of the both eyes is placed within an effective region; and
    correcting the projection location of the virtual image, when the detected center of the both eyes is placed within the effective region.

15. The method of claim 14, wherein a horizontal range of the effective region is defined as a range of an effective angle of view of the camera, and
    wherein a vertical range of the effective region is defined as a vertical movement range of the seat.

16. The method of claim 11, wherein an augmented reality image is displayed in front of the vehicle through the virtual image projected onto the display device.

17. The method of claim 16, wherein the correcting of the projection location of the virtual image includes correcting the projection location of the virtual image based on the location of the eye of the driver such that the augmented reality image is matched with a virtual location spaced apart from the vehicle by a predetermined distance.

18. The method of claim 11, wherein the correcting of the projection location of the virtual image includes correcting the projection location so as to be higher than a predetermined projection location, when the location of the eye of the driver is higher than a predetermined location.

19. The method of claim 11, wherein the correcting of the projection location of the virtual image includes correcting the projection location so as to be lower than a predetermined projection location, when the location of the eye of the driver is lower than a predetermined location.

20. The method of claim 11, wherein the display device includes a head-up display.

* * * * *